United States Patent
Gomez

(10) Patent No.: US 10,793,788 B2
(45) Date of Patent: Oct. 6, 2020

(54) METHOD FOR TREATING A PYROLYSIS GASOLINE

(71) Applicant: IFP Energies Nouvelles, Rueil-Malmaison (FR)

(72) Inventor: Adrien Gomez, Lyons (FR)

(73) Assignee: IFP Energies Nouvelles, Rueil-Malmaison (FR)

(*) Notice: Subject to any disclaimer, the term of this patent is extended or adjusted under 35 U.S.C. 154(b) by 0 days.

(21) Appl. No.: 16/336,963

(22) PCT Filed: Sep. 1, 2017

(86) PCT No.: PCT/EP2017/071988
§ 371 (c)(1),
(2) Date: Mar. 27, 2019

(87) PCT Pub. No.: WO2018/059872
PCT Pub. Date: Apr. 5, 2018

(65) Prior Publication Data
US 2019/0264115 A1 Aug. 29, 2019

(30) Foreign Application Priority Data
Sep. 28, 2016 (FR) ...................... 16 59218

(51) Int. Cl.
*C10G 65/06* (2006.01)
*C10G 45/02* (2006.01)
(Continued)

(52) U.S. Cl.
CPC ............ *C10G 65/06* (2013.01); *B01D 3/007* (2013.01); *B01D 3/322* (2013.01); *B01D 3/4283* (2013.01);
(Continued)

(58) Field of Classification Search
CPC ...... C10G 7/02; C10G 7/12; C10G 45/02–20; C10G 45/32–40; C10G 65/06; C10G 69/06; B01D 3/007; B01D 3/322
See application file for complete search history.

(56) References Cited

U.S. PATENT DOCUMENTS 6,083,378 A * 7/2000 Gildert .................. B01D 3/009
                                                            208/209
6,090,270 A * 7/2000 Gildert .................. C10G 45/32
                                                            208/210
(Continued)

FOREIGN PATENT DOCUMENTS

FR            2797639 A1      2/2001

OTHER PUBLICATIONS

International Search Report dated Oct. 6, 2017 issued in corresponding PCT/EP2017/071988 application (2 pages).

*Primary Examiner* — Renee Robinson
(74) *Attorney, Agent, or Firm* — Millen, White, Zelano and Branigan, P.C.

(57) ABSTRACT

The present invention relates to a method for treating a pyrolysis gasoline C5+ containing monoolefinic, diolefinic and sulfur hydrocarbons, comprising at least, and in any order: a) a step of hydrotreating the pyrolysis gasoline or a hydrocarbon fraction C6+ originating from the pyrolysis gasoline, in the presence of hydrogen and at least one hydrotreatment catalyst at a temperature ranging between 220 and 380° C. so as to produce a hydrotreated effluent; b) a step of separating the pyrolysis gasoline or the hydrotreated effluent originating from step a) when said step is completed before step b), into a separation column for separating into a top hydrocarbon fraction C5− and a bottom hydrocarbon fraction C6+, said separation column comprising a reboiling section including two heat exchangers, at least one of the two exchangers being configured to perform (Continued)

a heat exchange with a portion of the bottom fraction that is recycled in the column via the reboiling section. According to the invention, one of the two heat exchangers of the reboiling section is supplied with at least one portion of the hydrotreated effluent so as to supply part of the heat required to operate the reboiling section.

18 Claims, 7 Drawing Sheets

(51) Int. Cl.
*C10G 7/12* (2006.01)
*B01D 3/00* (2006.01)
*B01D 3/32* (2006.01)
*C10G 67/02* (2006.01)
*B01D 3/42* (2006.01)
*C10G 45/32* (2006.01)
*C10G 7/02* (2006.01)

(52) U.S. Cl.
CPC ............ *C10G 7/02* (2013.01); *C10G 7/12* (2013.01); *C10G 45/02* (2013.01); *C10G 45/32* (2013.01); *C10G 67/02* (2013.01); *C10G 2300/1044* (2013.01); *C10G 2300/201* (2013.01); *C10G 2300/202* (2013.01); *C10G 2300/301* (2013.01); *C10G 2400/02* (2013.01)

(56) References Cited

U.S. PATENT DOCUMENTS

| | | | |
|---|---|---|---|
| 6,896,795 B2 | 5/2005 | Didillon et al. | |
| 2002/0005373 A1* | 1/2002 | Gupta | C10G 45/00 208/58 |
| 2002/0153280 A1 | 10/2002 | Didillon et al. | |
| 2003/0230518 A1* | 12/2003 | Smith, Jr. | C10G 45/02 208/210 |
| 2004/0000506 A1* | 1/2004 | Podrebarac | C10G 45/02 208/211 |
| 2012/0108866 A1* | 5/2012 | Grenoble | C10G 45/02 585/259 |
| 2015/0119613 A1 | 4/2015 | Schmidt et al. | |
| 2016/0068764 A1 | 3/2016 | Kumar et al. | |

\* cited by examiner

METHOD FOR TREATING A PYROLYSIS GASOLINE

The present invention relates to the treatment of a feedstock of C5+ hydrocarbons containing mono-olefin, diolefin and sulfur-comprising hydrocarbons. The process makes it possible to treat in particular hydrocarbon cuts of gasoline type in order to improve the quality thereof in order for them to be able to be enhanced in value, for example to the gasoline pool or in an aromatic unit of the refinery. The process applies in particular to feedstocks of hydrocarbons denoted by the term "pyrolysis gasoline".

STATE OF THE ART

This is because pyrolysis and steam cracking gasolines contain gum-generating compounds which are diolefins as a mixture with mono-olefin compounds and aromatic compounds. It is therefore necessary to selectively hydrogenate these diolefins and possibly the styrene compounds through a stage, which is generally known as first hydrogenation stage, before catalytically treating them in order to remove the other impurities (e.g. the heavy metals and the sulfur) present in these gasolines. For example, for a C5-200° C. hydrocarbon cut, the operating conditions of this first stage are generally located between 80 and 160° C. (according to the catalyst employed) and under a total pressure of between 2 and 3.5 MPa. The catalysts most widely used for the first hydrogenation stage are based on palladium or on nickel.

This first stage produces a hydrocarbon cut freed from its diolefins but rich in aromatic compounds and in mono-olefin compounds, and also sulfur-comprising compounds. It is advisable to treat the hydrocarbon cut in order to lower the content of mono-olefin and sulfur-comprising compounds before the stage of extraction of the aromatics, for example. The hydrogenation of the olefins and the decomposition of the sulfur-comprising compounds generally involve two separate catalysts: the first making it possible to hydrogenate the mono-olefins to give paraffins and the second making it possible to hydrogenolyze the sulfur-comprising compounds. The hydrogenation of the mono-olefins uses, for example, sulfur-comprising supported catalysts having a nickel/molybdenum or nickel/tungsten bimetallic active phase. For the hydrogenolysis of the sulfur-comprising compounds, use is generally made of sulfur-comprising supported catalysts having a cobalt/molybdenum bimetallic active phase. The sulfur-comprising compounds include products of thiophene nature which are known to be refractory compounds, which makes it necessary to impose severe operating conditions (high temperature and high hydrogen pressure). For example, for a C5-200° C. cut, the reaction takes place for a mean temperature of between 300 and 380° C., for a total pressure between 2.5 and 3.5 MPa.

This process also comprises a stage of separation of the hydrogenated cuts in order to separate the C5 cut (intended, for example, for the gasoline pool) from the C6+ cut (intended, for example, for the extraction of the aromatics). This stage is carried out using a distillation column, which is also known as "depentanizer" by a person skilled in the art.

The operating conditions of the depentanizer are as follows:
an operating pressure of between 0.4 and 1.0 MPa;
a temperature at the column bottom of between 120 and 190° C.

The reboiling power of this column represents a major part of the steam consumption of the process for the hydrotreating of pyrolysis gasolines.

Thus, one aim of the present invention is to provide a process for the treatment of a pyrolysis gasoline containing mono-olefin, diolefin and sulfur-comprising hydrocarbons which is improved in terms of energy consumption.

SUMMARY OF THE INVENTION

A subject matter of the invention is a process for the treatment of a pyrolysis gasoline C5+ containing mono-olefin, diolefin and sulfur-comprising hydrocarbons, comprising at least and in any order:

a) a stage where the pyrolysis gasoline or a C6+ hydrocarbon cut resulting from the pyrolysis gasoline is hydrotreated in the presence of hydrogen and at least one hydrotreating catalyst at a temperature of between 220 and 380° C., so as to produce a hydrotreated effluent;

b) a stage where the pyrolysis gasoline or the hydrotreated effluent resulting from stage a), when the latter is carried out before stage b), is separated in a separation column into a top C5− hydrocarbon cut and a bottom C6+ hydrocarbon cut, said separation column comprising a reboiling section including a first heat exchanger and a second heat exchanger, at least one of the exchangers being configured in order to carry out a heat exchange with a part of the bottom cut which is recycled in the column via the reboiling section, and in which one of the heat exchangers of the reboiling section is fed with at least a part of the hydrotreated effluent, so to provide a part of the heat necessary for the operation of the reboiling section.

The process according to the invention clearly meets the objective of limiting the consumption of heat of the treatment process by carrying out a recovery of a part of the heat present in the hydrotreating effluent in order to satisfy, in part, the energy requirements necessary for the operation of the separation column (depentanizer) by using a heat source internal to the process exhibiting a temperature level compatible with the reboiling temperature at the column bottom. Furthermore, it has been found, surprisingly, that the recovery of heat for the column, directly at the outlet of the hydrotreating reactor, also makes it possible to limit the consumption of heat and of cold utility at the hydrotreating section, thus reinforcing the advantage contributed by the fall in the consumption of heat for the separation column.

In the context of the invention, the term "C5−" is intended to denote a cut containing hydrocarbons having at least 5 and less than 5 carbon atoms per hydrocarbon molecule. The term "C5+" is intended to denote a cut containing hydrocarbons having at least 5 and more than 5 carbon atoms per hydrocarbon molecule.

The term "C6+" is intended to denote a cut containing hydrocarbons having at least 6 and more than 6 carbon atoms per hydrocarbon molecule.

The term "mono-olefin" and its derivatives denote hydrocarbon molecules comprising a single carbon-carbon double bond. The term "diolefin" and its derivatives denote hydrocarbon molecules comprising two carbon-carbon double bonds.

Preferably, the other heat exchanger, that is to say the heat exchanger not fed with a part of the hydrotreated effluent, is fed with a condensable fluid in the gas state. Preferably, the gaseous fluid is pressurized steam.

According to a first embodiment, the first heat exchanger and the second heat exchanger are positioned in series so that the bottom cut, which is recycled in the column, successfully passes through the first heat exchanger and the second heat exchanger.

Alternatively, the first heat exchanger and the second heat exchanger are positioned in parallel so that a part of the bottom cut recycled in the column passes through the first heat exchanger and the other part of the bottom cut recycled in the column passes through the second heat exchanger.

According to another embodiment of the process, the bottom cut recycled in the column is sent through the heat exchanger fed with a condensable gaseous fluid, a partially condensed stream is recovered from said heat exchanger and the partially condensed stream is sent through the heat exchanger fed with the hydrotreated effluent, so as to at least partially vaporize said stream.

According to one embodiment, when stage b) is carried out after stage a), the process comprises a stage c) in which the nonrecycled bottom cut resulting from stage b) is sent into a unit for the extraction of aromatic hydrocarbons.

Alternatively, when stage b) is carried out before stage a), the process comprises a stage c') in which the hydrotreated effluent (that is a say the C6+ cut) is sent into a unit for the extraction of aromatic hydrocarbons.

Stage a) preferably employs a catalyst for the selective hydrogenation of mono-olefin and/or diolefin hydrocarbons. Alternatively, stage a) employs a hydrodesulfurization catalyst. According to a preferred embodiment, stage a) successively employs a catalyst for the selective hydrogenation of mono-olefins and a hydrodesulfurization catalyst. In this embodiment, the hydrogenation and hydrodesulfurization catalysts are positioned in one and the same reactor or in two reactors arranged in series. It is, of course, possible to employ one or more successive beds of catalysts making possible the desired catalytic reaction. The hydrotreating stage can use a catalyst moving bed or fixed bed reactor, preferably a fixed bed reactor. Preferably, stage a) employs just one reactor successively containing, in the direction of circulation of the feedstock, a fixed bed of hydrogenation catalyst and a fixed bed of hydrodesulfurization catalyst.

The process according to the invention can employ, before stage a) or before stage b), when this is carried out before stage a), a stage in which the diolefin hydrocarbons of the pyrolysis gasoline are selectively hydrogenated in the presence of hydrogen and of a hydrogenation catalyst, at a temperature of between 40 and 200° C., at a pressure of between 1 and 8 MPa and with an overall hourly space velocity (HSV), defined as the ratio of the flow rate by volume of the fresh feedstock of hydrocarbons at 15° C. to the total volume of catalyst, generally from 1 h$^{-1}$ to 100 h$^{-1}$, so as to produce an effluent having a low content of diolefin hydrocarbons which is subsequently treated in stage a).

The process according to the invention can treat a pyrolysis gasoline which results from a steam cracking unit.

BRIEF DESCRIPTION OF THE DRAWINGS

The other characteristics and advantages of the invention will become apparent on reading the description which will follow, given solely by way of illustration and without limitation, and with reference to the drawings, among which.

DETAILED DESCRIPTION OF THE INVENTION

Description of the Feedstock

The process according to the invention makes it possible to treat any feedstock of hydrocarbons of C5+ pyrolysis gasoline type containing mono-olefin, diolefin and sulfur-comprising hydrocarbons.

Pyrolysis gasoline is understood to mean a gasoline resulting from various pyrolysis processes, such as steam cracking, visbreaking and/or coking. Preferably, the pyrolysis gasoline is a steam cracking gasoline.

The pyrolysis gasoline corresponds to a hydrocarbon cut, the boiling point of which is generally between 0 and 250° C., preferably between 10 and 220° C. The unsaturated hydrocarbons present in said pyrolysis gasoline are in particular diolefin compounds (butadiene, isoprene, cyclopentadiene, and the like), styrene compounds (styrene, α-methylstyrene, and the like) and indene compounds (indene, and the like).

The pyrolysis gasoline can be a C5-C12 cut with traces of C3, C4, C13, C14 and C15 (for example between 0.1% and 3% by weight for each of these compounds). For example, a feedstock formed of pyrolysis gasoline generally has a following composition as % by weight: 5% to 15% by weight of paraffins, 30% to 65% by weight of aromatic compounds, 5% to 15% by weight of mono-olefins, 15% to 25% by weight of diolefins, 2% to 8% by weight of alkenylaromatic compounds and from 20 to 300 ppm by weight of sulfur (parts per million), indeed even up to 2000 ppm of sulfur for some difficult feedstocks.

Figure 1:
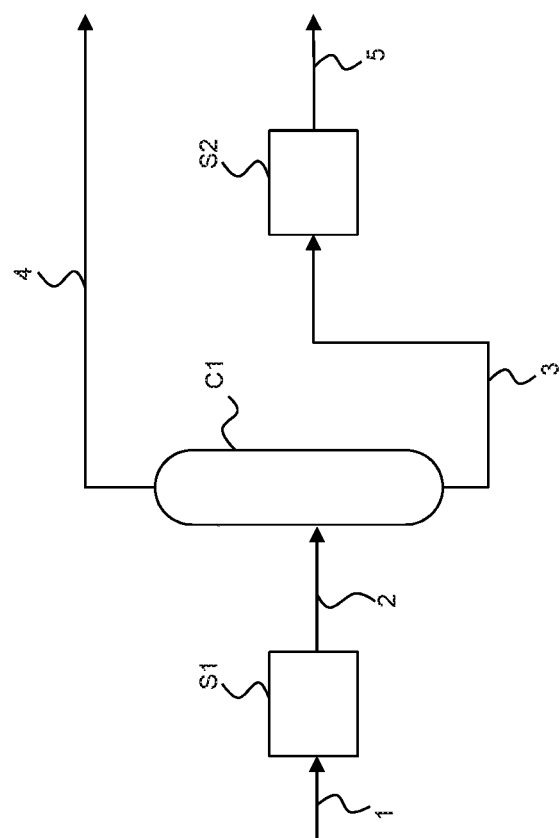
FIG. 1 est a representation of the block diagram type showing the stages of a process for the treatment of a feedstock of hydrocarbons of C5+ pyrolysis gasoline type containing mono-olefin, diolefin and sulfur-comprising hydrocarbons.

With reference to FIG. 1, the pyrolysis gasoline feedstock is introduced via the pipe 1 into a first hydrogenation stage S1. The pyrolysis gasoline is brought into contact with a gas phase containing hydrogen and a selective hydrogenation catalyst. The effluent produced by the first hydrogenation stage is subsequently sent via the pipe 2 into a separation column (depentanizer) C1 configured and operated in order to separate, at the top of the column, a hydrogenated C5– hydrocarbon cut which is sent, for example, toward the gasoline pool via the line 4. This separation stage corresponds to stage b) of the process which is carried out before stage a). The complementary C6+ hydrocarbon cut drawn off at the bottom of the column C1 is introduced via the pipe 3 into a second hydrotreating stage S2 (stage a) of the process according to the invention). Preferably, the second hydrotreating stage S2 comprises a stage of selective hydrogenation followed by a hydrodesulfurization stage successively employing a selective hydrogenation catalyst and a hydrodesulfurization catalyst. This second stage can be carried out in a single reactor successively containing two beds, for example fixed beds, of catalyst. Alternatively, it is possible to use a first reactor containing a bed of selective hydrogenation catalyst followed (in series) by a second reactor containing a bed of hydrodesulfurization catalyst.

The hydrogenated and desulfurized C6+ cut is sent via the pipe 5 toward, for example, a unit for extraction of the aromatics.

Figure 2:
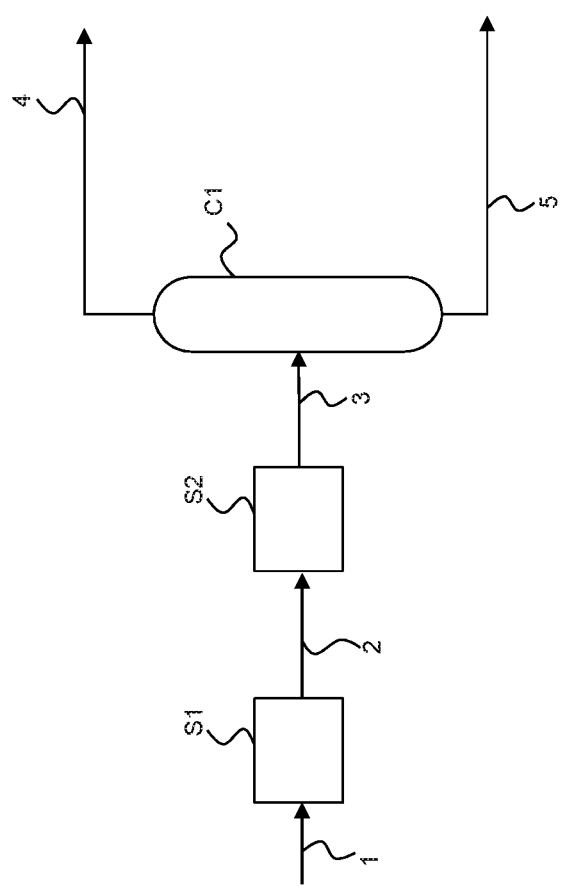
FIG. 2 est a representation of the block diagram type showing the stages of another process for the treatment of a feedstock of hydrocarbons of C5+ pyrolysis gasoline type containing mono-olefin, diolefin and sulfur-comprising hydrocarbons.

With reference to FIG. 2, which shows another diagram for the treatment of the pyrolysis gasoline, the hydrocarbon feedstock is introduced via the pipe 1 into the first hydrogenation stage S1 and the partially hydrogenated effluent is sent via the pipe 2 into the second hydrotreating stage S2 (stage a) carried out before the separation stage b)). The hydrogenated and desulfurized pyrolysis gasoline resulting from the second hydrotreating stage is introduced via the pipe 3 into the separation column C1 (stage b) of the process) in order to recover, at the top, via the pipe 4, the hydrogenated and desulfurized C5− cut and, at the bottom, via the pipe 5, the hydrogenated and desulfurized C6+ cut.

Preferably, the first selective hydrogenation stage is targeted at selectively hydrogenating, in the presence of hydrogen, the diolefin and mono-olefin compounds present in the pyrolysis gasoline while limiting the hydrogenation of the aromatic compounds.

The selective hydrogenation is generally carried out at a (hydrogen)/(unsaturated compounds to be hydrogenated) molar ratio of between 0.5 and 10, more preferably between 0.7 and 5 and preferably between 1 and 2. The hydrogen flow rate is adjusted in order to have available an amount of hydrogen sufficient to theoretically hydrogenate all of the polyunsaturated compounds with the exception of the aromatic nuclei and to maintain an excess of hydrogen at the outlet of this zone in order to finalize the selective hydrogenation of the mono-olefin compounds and to carry out the hydrodesulfurization in the second hydrotreating stage S2.

The selective hydrogenation is generally carried out at a temperature ranging from 40 to 200° C. and preferably ranging from 60 to 180° C. The pressure is preferably between 1 and 8 MPa and more preferably between 1.5 and 7 MPa. The overall hourly space velocity (HSV), defined as the ratio of the flow rate by volume of the fresh feedstock of hydrocarbons at 15° C. to the total volume of catalyst present in the first selective hydrogenation zone, is generally from 1 $h^{-1}$ to 100 $h^{-1}$, preferably from 1 $h^{-1}$ to 50 $h^{-1}$.

Preferably, the selective hydrogenation is carried out at a (hydrogen)/(polyunsaturated compounds to be hydrogenated) molar ratio generally of between 1 and 2, at a temperature generally of between 40 and 200° C., preferably between 60 and 180° C., at an hourly space velocity (HSV) generally of between 1 $h^{-1}$ and 6 $h^{-1}$ and at a pressure generally of between 1.5 MPa and 7 MPa.

The catalyst used for the selective hydrogenation is a catalyst comprising at least one metal from Group VIII (CAS classification (CRC Handbook of Chemistry and Physics, published by CRC Press, editor-in-chief D. R. Lide, 81st edition, 2000-2001) corresponding to the metals of Columns 8, 9 and 10 according to the new IUPAC classification), more preferably palladium, platinum or nickel.

The metal from Group VIII can be homogeneously dispersed within the support or it can be deposited as a crust at the periphery of the support (beads, extrudates). This distribution as a crust is well known to a person skilled in the art and makes possible a better selectivity of the catalyst.

When the metal from Group VIII is palladium, the palladium content is between 0.01% and 2% by weight of the weight of the catalyst, preferably from 0.03% to 0.8% by weight.

When the metal from Group VIII is platinum, the platinum content is between 0.01% and 2% by weight of the weight of the catalyst, preferably from 0.03% to 0.8% by weight.

When the metal from Group VIII is nickel, the nickel content is between 1% and 50% by weight of the weight of the catalyst, preferably between 5% and 40% by weight and more preferably between 7% and 30% by weight.

The "% by weight" values are based on the elemental form of the metal from Group VIII.

The catalyst comprises in particular a porous support formed of at least one simple oxide chosen from alumina ($Al_2O_3$), silica ($SiO_2$), titanium oxide ($TiO_2$), ceria ($CeO_2$) and zirconia ($ZrO_2$). Preferably, said support is chosen from aluminas, silicas and silicas/aluminas. The porous support can in particular be provided in the form of extrudates (for example cylindrical, trilobal or quadrilobal), of beads, of pellets or of irregular and nonspherical agglomerates, the specific shape of which can result from a crushing stage. Very advantageously, the support is provided in the form of extrudates.

The second hydrotreating stage S2 preferably employs a catalytic section comprising a selective hydrogenation catalyst (or selective hydrogenation section) and a catalytic section comprising a hydrodesulfurization catalyst (or hydrodesulfurization section). The selective hydrogenation stage of the second hydrotreating stage, which is targeted at hydrogenating the diolefin and mono-olefin compounds still present in the hydrocarbon feedstock without hydrogenating the aromatic compounds, is carried out at a temperature generally of between 160 and 320° C., preferably between 180 and 300° C., at an hourly space velocity (HSV) generally of between 1 $h^{-1}$ and 6 $h^{-1}$ and at a pressure generally of between 1.5 MPa and 7 MPa and with a (hydrogen)/(unsaturated compounds to be hydrogenated) molar ratio generally of between 0.5 and 2. The selective hydrogenation catalyst used in the second hydrotreating stage corresponds to the description made above and which is not taken up again for reasons of conciseness.

The second hydrotreating stage involves a hydrodesulfurization section deploying a hydrodesulfurization catalyst which makes possible, in the presence of hydrogen, the hydrogenolysis of the sulfur-comprising compounds present in the pyrolysis gasoline. The operation is generally carried out at a (hydrogen)/(feedstock) molar ratio of between 0.5 and 10, more preferably between 0.7 and 5 and preferably between 1 and 2. The hydrodesulfurization is generally carried out at a temperature ranging from 180 to 450° C., preferably ranging from 200 to 420° C. and preferably ranging from 220 to 380° C.

The pressure is preferably between 1 and 8 MPa, more preferably between 1.5 and 7 MPa.

The overall hourly space velocity (HSV), defined as the ratio of the flow rate by volume of the fresh feedstock at 15° C. to the total volume of the reaction zone, is generally from 0.1 $h^{-1}$ to 80 $h^{-1}$, preferably from 0.4 $h^{-1}$ to 40 $h^{-1}$ and more preferably still between 0.5 and 5 $h^{-1}$.

The catalyst used in the hydrodesulfurization zone is a catalyst known to a person skilled in the art for a process for the hydrodesulfurization of a pyrolysis gasoline feedstock. The hydrodesulfurization catalyst generally contains at least one metal from Group VIb and/or at least one metal from Group VIII on a porous support.

The metal from Group VIb is preferably molybdenum or tungsten and the metal from Group VIII is preferably chosen from nickel or cobalt. The content of metal from Group VIII, expressed as oxide, is generally between 0.5% and 15% by weight and preferably between 1% and 10% by weight, with respect to the total weight of the catalyst. The content of metal from Group VIb is generally between 1.5% and 60% by weight and preferably between 3% and 50% by weight, with respect to the total weight of the catalyst.

The support of the catalyst is usually a porous solid, such as, for example, an alumina, a silica/alumina, magnesia, silica or titanium oxide, alone or as a mixture. Very preferably, the support is chosen from an alumina, a silica/alumina or a silica.

The porous support can in particular be provided in the form of beads, of extrudates (for example trilobal or quadrilobal), of pellets or of irregular and nonspherical agglomerates, the specific shape of which can result from a crushing stage. Very advantageously, the support is provided in the form of beads or of extrudates.

Preferably, when the (second) hydrotreating stage employs a single reactor containing two successive catalytic beds for hydrogenation and then for hydrodesulfurization, this is carried out under the following conditions:

Temperature of between 180 and 450° C., preferably between 220 and 380° C.;
Total pressure of between 1 and 8 MPa, preferably between 1.5 and 7 MPa;
Overall HSV of between 0.4 and 40 $h^{-1}$, preferably between 0.5 and 5 $h^{-1}$.

The operating conditions of the separation column C1 (depentanizer) are analogous for the process diagrams represented in FIGS. 1 and 2. This column is operated with an operating pressure of between 0.4 and 1.0 MPa, with a column bottom temperature varying between 120 and 190° C.

Figure 3:
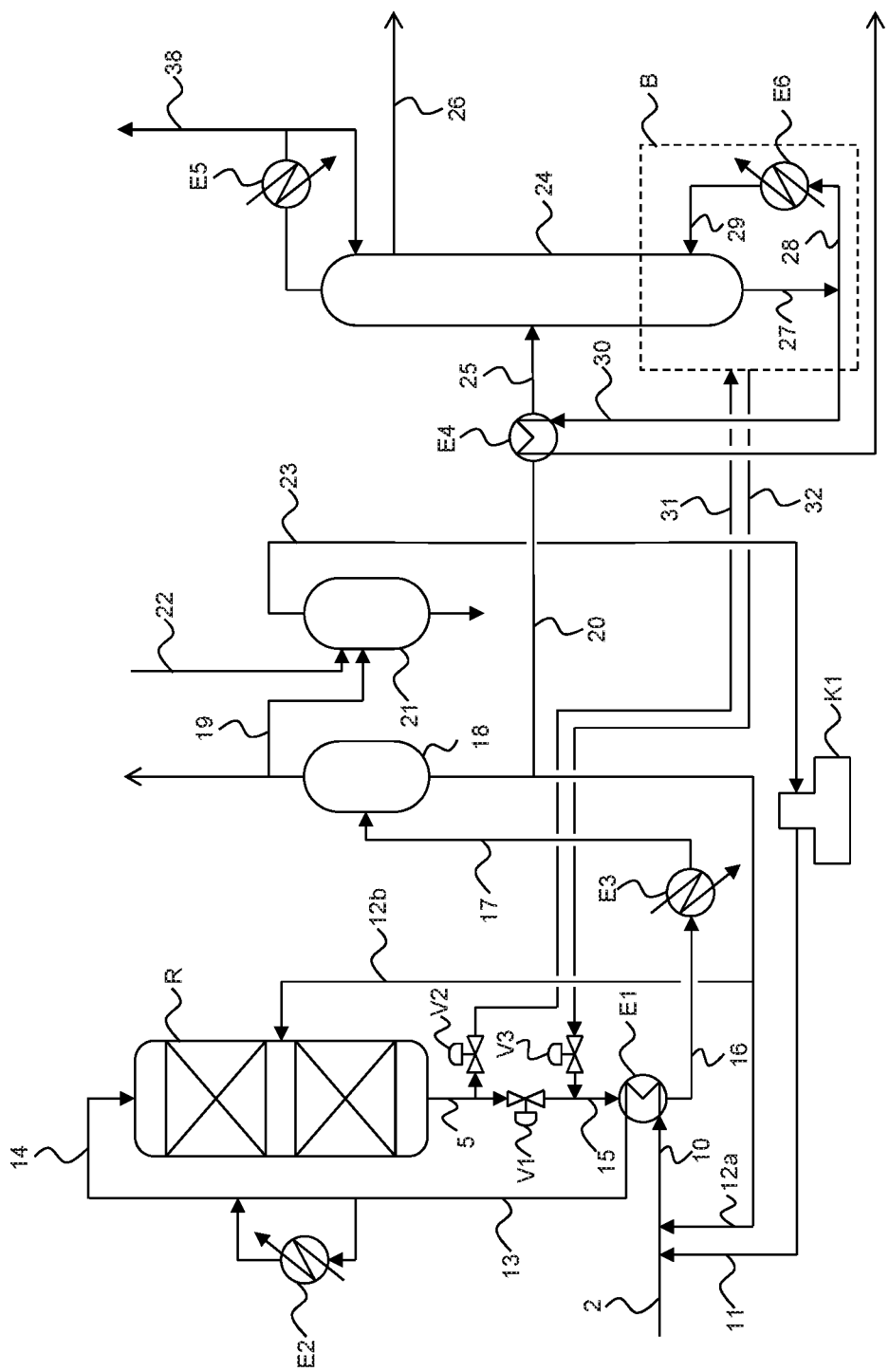
FIG. 3 shows a schematic diagram of the process according to the invention.

FIG. 3 is a detailed diagram of an embodiment of the process for the treatment of a pyrolysis gasoline based on the overall diagram of FIG. 2. The pyrolysis gasoline originating from the first selective hydrogenation stage is introduced via the pipe 2, mixed with compressed hydrogen contributed from the line 11, and optionally mixed with a product recycling stream (described in detail below) conveyed via the pipe 12a. The hydrocarbons/hydrogen mixture is introduced via the pipe 10 into a feedstock/effluent exchanger E1 in order to be brought to a temperature of between 220 and 300° C. and to a pressure of between 2.5 and 3.5 MPa. The hot effluent which feeds the exchanger E1 originates from the hydrotreating reactor R. The hydrocarbons/hydrogen mixture heated by the exchanger E1 is introduced via the line 13 into a preheater E2 which makes it possible to bring the temperature of the mixture to a temperature typically of between 240 and 320° C. The heat exchanger E2 can use, as heat source, any type of condensable or noncondensable fluid or else carry out a combustion of a gas or of a liquid fuel. The hydrocarbons/hydrogen mixture resulting from the preheater E2 is conveyed via the pipe 14 toward the inlet of the hydrotreating reactor R. The reactor makes it possible to carry out the second hydrotreating stage of the overall diagram of FIG. 2. The reactor R successively comprises, with respect to the direction of circulation of the hydrocarbon feedstock, a selective hydrogenation section and a hydrodesulfurization section. The reactor R carries out the selective hydrogenation of the diolefins and of the monoolefins not hydrogenated during the first hydrogenation stage and the hydrogenolysis of the organosulfur compounds. The reactor R is thus successively equipped, with respect to the direction of circulation of the hydrocarbon feedstock, with a bed containing selective hydrogenation catalyst and a bed containing hydrodesulfurization catalyst.

The hydrotreated effluent 5 resulting from the reactor R, which is at a temperature of, for example, between 300 and 380° C., is conventionally introduced via the line 15 into the feedstock/effluent exchanger E1 described above, from which it exits, via the pipe 16, at a temperature generally of between 110 and 160° C. The stream 16 is again cooled using an exchanger/cooler system E3 to a temperature typically of between 35 and 65° C., in order to make possible a partial condensation of the hydrotreated effluent. The line 17 conveys the effluent cooled by the exchanger E3 into a knockout vessel 18 in order to separate a hydrogen-rich gas phase 19 from the condensate (liquid phase rich in hydrocarbons). A part of the condensate is recycled via a pipe 12a in order to be mixed with the hydrocarbon feedstock (line 2) and another part of the condensate is recycled via the pipe 12b in order to be injected into the reactor R in order to control the thermal profile in the reactor. Another part of the condensate is sent via the pipe 20 to a heat exchanger E4. It should be noted that, in FIG. 3, a portion of the gas phase at the top of the knockout vessel 18 is discharged via the pipe 19 in order to be mixed in the vessel 21 with the hydrogen from the pipe 22 originating, for example, from the first selective hydrogenation stage (section S1 of FIGS. 1 and 2). A hydrogen-rich gas is discharged from the vessel 21 via the pipe 23, then compressed in the compressor K1 and then conveyed, via the pipe 11, in order to be mixed with the line 2.

The condensate reheated by the feedstock/effluent exchanger E4 is sent into the separation column 24 via the pipe 25. The column 24, also known as depentanizer, is operated in order to separate, at the column top, a cut C5−, which is discharged via the line 26, and a cut C6+, which is discharged via the bottom of the column via the line 27. The separation column 24 can be operated, for example, at a column bottom temperature of between 140 and 190° C. and at a pressure of between 0.4 and 1.0 MPa. As indicated in FIG. 3, the top of the column 24 can comprise a partial condenser E5 which makes it possible to recover the hydrocarbons condensable at a temperature of between 35 and 60° C., which are returned at the top of the column 24. The noncondensable gases are discharged via the line 38.

The heat necessary for the separation of the C5− cut from the C6+ cut is contributed by the reboiling section B of the column 24, which comprises a heat exchanger (or reboiler) E6 which makes it possible to vaporize all or part of the column bottom stream C6+ 28 which is recycled in the separation column via the line 29. The reboiler E6 of the reboiling section B is thus conventionally fed with heat using steam and by extension by any type of condensable or noncondensable fluid having a temperature level compatible with the vaporization temperature on the process side. The stream, completely or partially vaporized, at a temperature of generally between 140 and 190° C. and at a pressure of between 0.4 and 1.0 MPa, is discharged from the exchanger E6 via the line 29 and returned into the separation column 24. The part of the C6+ cut obtained at the bottom of column 24 which is not sent to the reboiler is discharged via the line 30 and then introduced into the feedstock/effluent exchanger E4, in which it is cooled. The C6+ hydrocarbon cut can be used as feedstock in a unit for the extraction of aromatic hydrocarbons.

According to the invention, with reference to FIG. 3, the hydrotreated effluent 5 resulting from the reactor R is completely or partially sent to the reboiling section B of the column 24 via the pipe 31 by virtue of a control of flow rate and of pressure carried out using the valves V1, V2 and V3. The effluent sent via the pipe 31 is cooled in the reboiling section and then returned via the pipe 32 into the line 15. The heat present in the effluent at the outlet of the hydrotreating reactor R is supplied to the reboiling section in order to reduce the consumption of heat utility necessary for the operation of the reboiler.

The reboiling section can exhibit several configurations described in detail in FIGS. 4, 5, 6 and 7.

Figure 4:
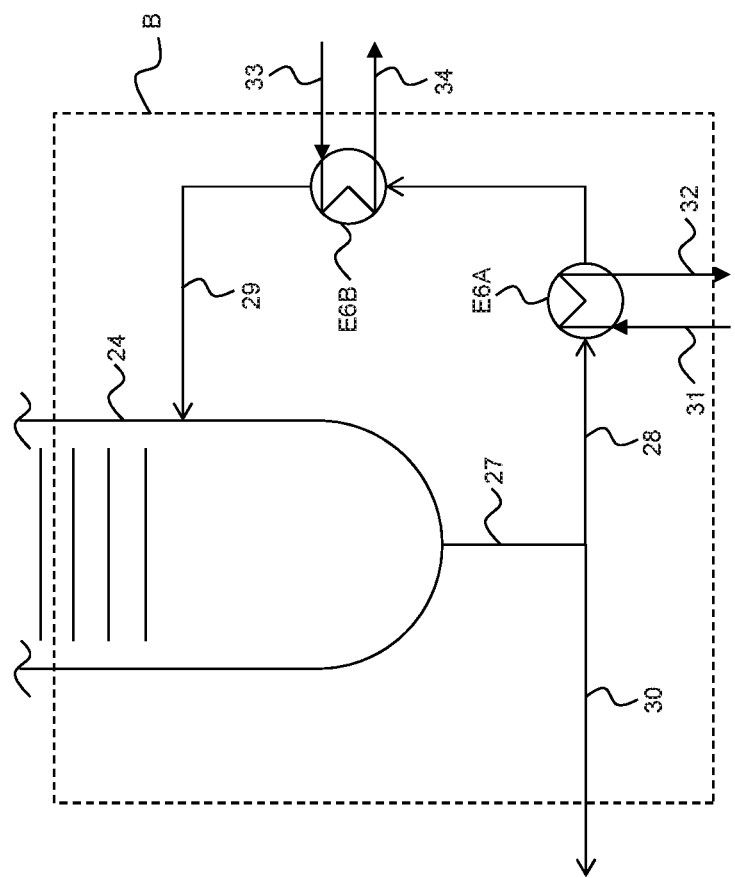
FIG. 4 shows the reboiling section of the separation column used in the process according to the invention.
Figure 5:
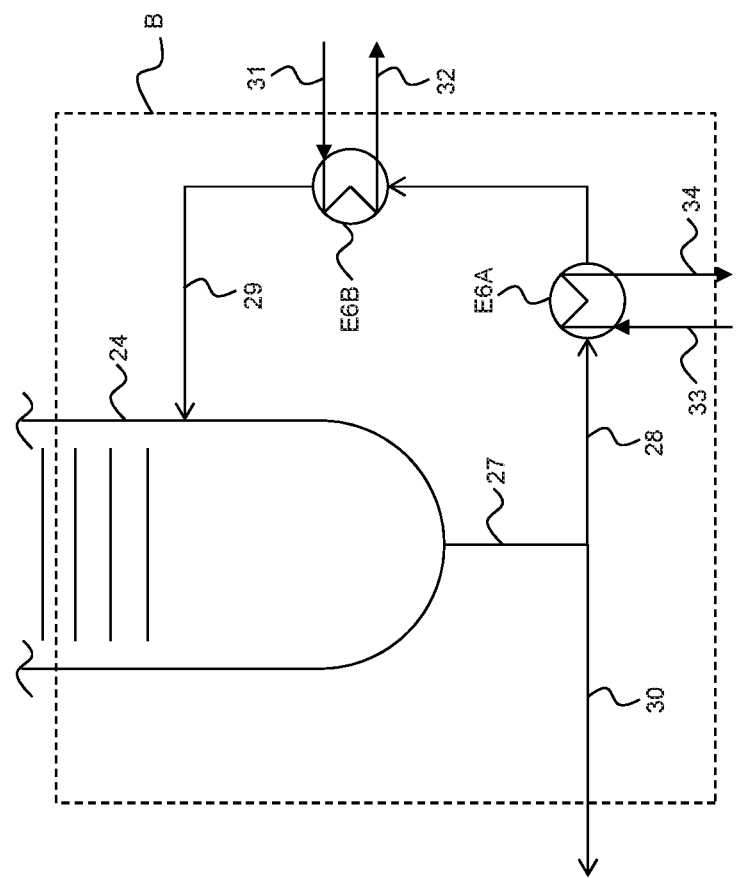
FIG. 5 shows the reboiling section of the separation column used in the process according to the invention according to another embodiment.

The reboiling section of FIGS. 4 and 5 comprises two separate heat exchangers E6A and E6B positioned in series, each employing a different heating fluid. In the case of FIG. 4, the C6+ cut from the bottom of the column 24 which is intended to be recycled in said column is sent via the line 28 into the inlet of the exchanger E6A which uses, as heat source, the effluent resulting from the hydrotreating reactor R contributed via the line 31. The effluent undergoes a cooling and is discharged from the exchanger E6A via the pipe 32, as shown in FIGS. 3 and 4. The heated C6+ cut is subsequently conveyed into the heat exchanger E6B positioned in series after the exchanger E6A which uses, as heat source, a condensable fluid in the gas state, for example superheated steam, conveyed via the line 33. The cooled condensable fluid undergoes a partial or complete condensation in the heat exchanger E6B and is discharged via the line 34.

The configuration of the reboiling section of FIG. 5 differs from that of FIG. 4 in that the heat exchanger E6A uses, as heat source, a condensable fluid in the gas state (e.g. superheated steam) conveyed via the line 33, while the heat exchanger E6B positioned in series after the exchanger E6A uses, as heat source, the hydrotreated effluent from the reactor R, which is introduced via the line 31.

Figure 6:
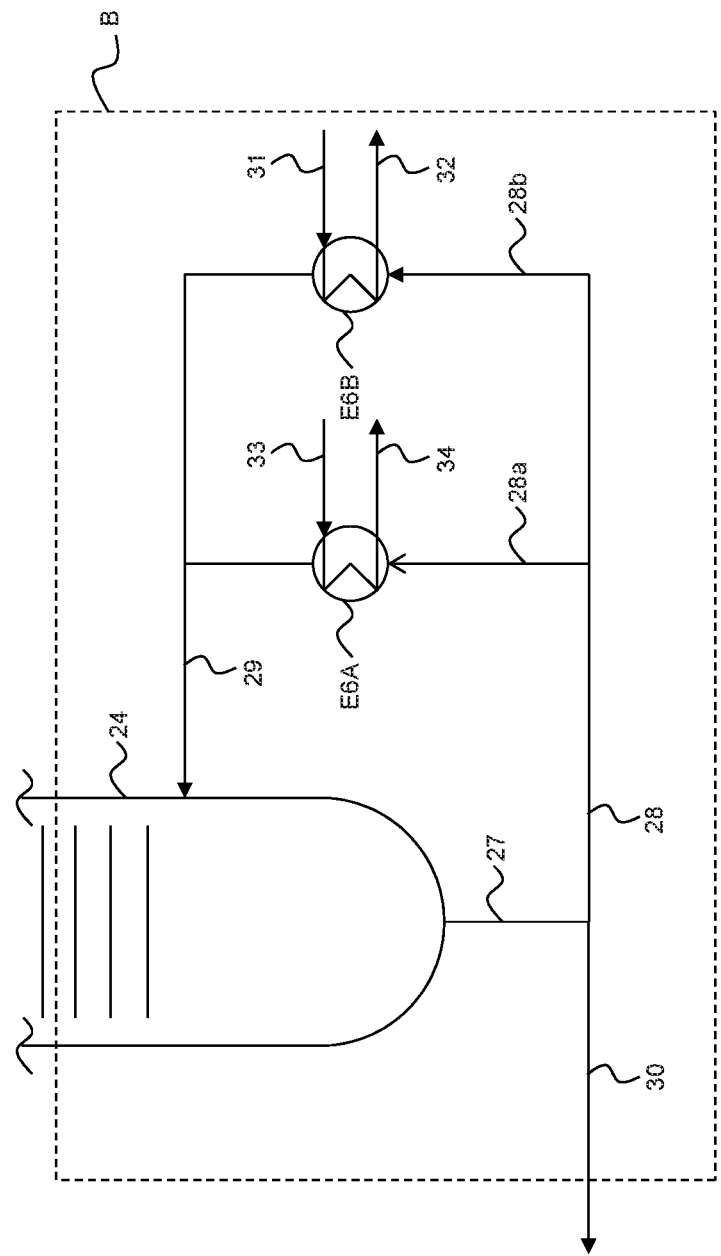
FIG. 6 shows the reboiling section of the separation column used in the process according to the invention according to an alternative embodiment.

FIG. 6 represents another configuration of the reboiling section B according to the invention in which the heat exchangers E6A and E6B are positioned in parallel, each employing a different heating fluid. As indicated in FIG. 6, the C6+ cut sent to the reboiling section B of the separation column 24 is separated into two streams 28a and 28b with different flow rates respectively feeding the exchangers E6A and E6B.

According to FIG. 6, the heat exchanger E6A uses, as heat source, a condensable fluid in the gas state (for example superheated steam) originating from the line 33. The condensable fluid in the gas state undergoes a partial or complete condensation in the heat exchanger E6B and is discharged via the line 34. The exchanger E6B uses, as heat source, the hot hydrotreated effluent resulting from the hydrotreating reactor R.

Figure 7:
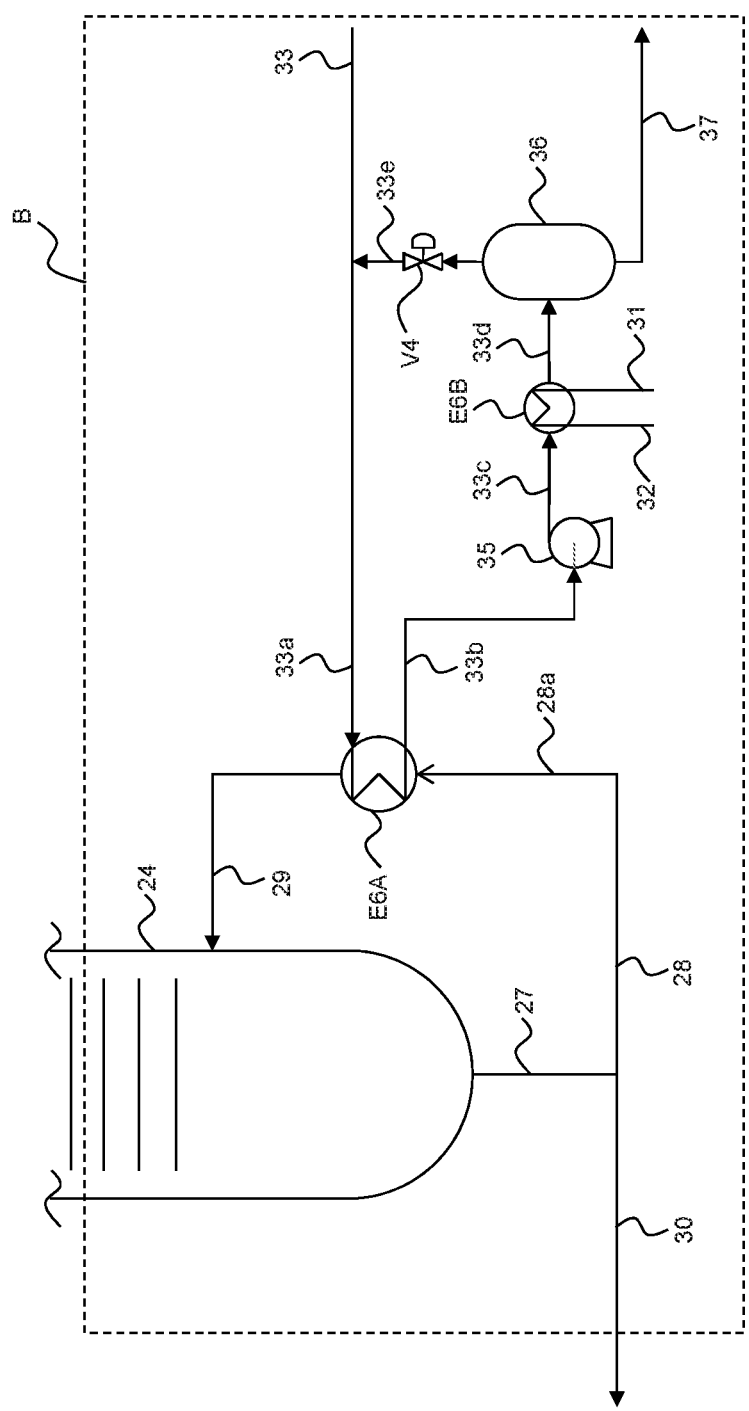
FIG. 7 shows the reboiling section of the separation column used in the process according to the invention according to an alternative embodiment.

FIG. 7 shows another configuration of the reboiling section of the separation column according to the invention which is based on the principle of vaporization of the condensates produced by the cooling of the condensable heating fluid after passing through a first exchanger by means of a second heat exchanger.

With reference to FIG. 7, the condensable gaseous fluid (e.g. superheated steam) is introduced into the reboiling section B via the lines 33 and 33a in the heat exchanger E6A, in which also circulates the C6+ cut which is recycled in the separation column. The condensable fluid undergoes a partial or complete condensation in the heat exchanger E6A and is discharged via the line 33b. The partially or completely condensed fluid is pressurized to a value equal to or greater than the pressure of the line 33a by means, for example, of a pump 35. The partially or completely condensed compressed fluid is sent via the line 33c to the heat exchanger E6B which uses, as heat source, the reaction effluent resulting from the hydrotreating reactor R introduced via the line 31. The reaction effluent undergoes a cooling by exchanging its heat with the partially or completely condensed compressed fluid and is discharged from the heat exchanger E6B via the pipe 32. The condensed fluid from the line 33c is completely or partially vaporized in the heat exchanger E6B and is then discharged via the line 33d. The vaporized condensable fluid from the line 33d is optionally introduced into a knockout vessel 36. The vaporized condensable fluid under pressure recovered at the top of the knockout vessel 36 is brought to a pressure equivalent to that of the line 33 using the valve V4 and is then returned to the line 33a via the pipe 33e. The noncondensable products from the knockout vessel 36 are discharged via the line 37.

The detailed description corresponds to embodiments in which the stage of separation of the C5− and C6+ cuts is carried out after the stage of hydrotreating the pyrolysis gasoline, as represented in FIG. 2. It should be remembered that, in the context of the invention, the separation stage can be carried out before the hydrotreating stage, so that only the C6+ cut is hydrotreated, while retaining the advantages of the thermal integration between the separation and hydrotreating stages.

The following examples illustrate the invention without limiting the scope thereof and show the improvement contributed with regard to the consumption of hot and cold utilities by the hydrogenation process.

Example 1 (Comparative)

The example refers to the process represented in FIG. 3, which represents the ($2^{nd}$) hydrotreating stage, followed by the stage of separation by means of a separation column (depentanizer).

The operating conditions chosen for this example correspond to end of run conditions. Under these conditions, the catalyst exhibits a reduced activity which makes it necessary to increase the temperature in the hydrotreating reactor in order to maintain the desired conversions. Under such conditions, the power of the heat exchangers is employed at their maximum level.

Table 1 gives the composition of the hydrocarbon feedstock treated in example 1. It is a C5+ cut resulting from a pyrolysis unit which has undergone a pretreatment in a reactor for the selective hydrogenation of diolefins.

TABLE 1

| Composition of the hydrocarbon feedstock | | | | | |
|---|---|---|---|---|---|
| Paraffins/ Napthenes | Aromatics | Mono- olefins | Diolefins | Alkenyl- Aromatics | Sulfur-comprising compounds |
| 21.19% by weight | 66.86% by weight | 10.40% by weight | <1% by weight | 0.03% by weight | 200 ppm (weight S) |

The hydrocarbon feedstock is sent into a hydrotreating reactor comprising, successively in the direction of flow of the feedstock, a catalytic bed for the selective hydrogenation of diolefins and mono-olefins and a catalytic hydrodesulfurization bed.

The selective hydrogenation catalyst is of the type of NiMo on an alumina support, the NiO and $MoO_3$ contents of which are respectively 11% and 8% by weight, with respect to the total weight of the catalyst.

The hydrodesulfurization catalyst is of the type of CoMo on an alumina support, the CoO and $MoO_3$ contents of which are respectively 3% and 14% by weight, with respect to the total weight of the catalyst.

Under end of run conditions, the hydrotreating reactor is operated under the following conditions:

P (total)=2 MPa;
Hourly Space Velocity (overall)=3 $h^{-1}$;
Temperature (inlet of the reactor)=300° C.

The hydrotreated effluent at the outlet of the reactor is at a temperature of approximately 360° C.

The separation column (depentanizer) is employed at a pressure of 0.7 MPa and with a column bottom temperature of 168° C.

The following table 2 gives the energy consumptions of the existing exchangers in the process according to FIG. 3. The powers are represented as relative values with respect to a base 100 and with respect to the power of the heat exchanger E4. This is because the power of the exchanger E4 is not impacted by the invention. This base will be identical for example 2.

Table 2 also shows the type of hot or cold utility used by the different heat exchangers. It may be noted, in this example, that the exchanger/cooler E3 consists of a first exchanger for cooling with air (denoted E3-A) pulsed by a blower propelled by an electric motor and then of a second exchanger for cooling using cold water (denoted E3-W).

TABLE 2

| Exchanger | Power (base 100) in arbitrary unit AU | Service | Utility |
|---|---|---|---|
| E1 | 1267 | Feedstock/Effluent | — |
| E2 | 98 | Preheater | High-pressure steam |
| E3-A | 616 | Air cooler | Electricity |
| E3-W | 80 | Water cooler | Cold water |
| E4 | 100 | Feedstock/Effluent | — |
| E5 | 363 | Condenser | Cold water |
| E6 | 473 | Feedstock/vaporized condensable fluid exchanger | Medium-pressure steam |

Example 2 (According to the Invention)

Example 2 refers to the process of FIG. 3 with a reboiling section represented in FIG. 4. The feedstock is the same as that of example 1 and is treated under the same operating conditions for the hydrotreating reactor and the separation column as those described in example 1.

Under these conditions, the catalyst exhibits a reduced activity and the temperature levels are higher in order to maintain the conversions.

In this example, the effluent exiting from the hydrotreating reactor at approximately 360° C. (end of run conditions) in the gas state is completely conveyed via the pipe 31 into the reboiling section of the separation column which is configured according to FIG. 4. The cooled effluent emerges in its entirety from the reboiling section via the pipe 32 at a temperature of approximately 320° C.

Table 3 indicates the energy consumptions of the exchangers, which are expressed in relative values with respect to a base 100 and with respect to the power of the exchanger E4. This is because the power of the exchanger E4 is not impacted by the invention. This base is identical to example 1.

TABLE 3

| Exchanger | Power (base 100) in arbitrary units AU | Service | Utility | Utilities Consumption Reduction with respect to example 1 |
|---|---|---|---|---|
| E1 | 1382 | Feedstock/Effluent | | |
| E2 | 0 | Preheater | High-pressure steam | 100% |
| E3-A | 348 | Air cooler | Electricity | 44% |
| E3-W | 80 | Water cooler | Cold water | 0% |
| E4 | 100 | Feedstock/Effluent | | |
| E5 | 363 | Condenser | Cold water | 0% |
| E6A | 300 | Exchanger Feedstock/Effluent | | |
| E6B | 173 | Feedstock/vaporized condensable fluid exchanger | Medium-pressure steam | 64% |

On comparing tables 2 and 3, it is noted that the process according to the invention makes it possible to reduce by 64% the consumption of medium-pressure steam for the reboiler E6B, in comparison with the consumption of medium-pressure steam of use for operating the reboiler E6 of example 1. The other part of the energy necessary for the operation of the reboiler is contributed via the feedstock/effluent exchanger E6A, which is fed with the effluent from the hydrotreating reactor.

A better recovery of heat is also observed at the feedstock/effluent exchanger E1, which makes it possible to reduce by 100% the consumption of high-pressure steam of the exchanger E2 and to reduce by 44% the electric consumption of the exchanger/air cooler E3-A.

These decreases are explained in the following way:
- for the preheater E2: in example 1, the role of this preheater is to preheat the feedstock to a temperature of 300° C. at the inlet of the hydrotreating reactor, in order to supplement the heat recovered via the exchange E1. In example 2, it is possible to suppress the consumption of heat for the preheater E2 by reducing the temperature pinch and by increasing the exchange surface area of the exchanger E1. This adjustment does not in any way affect the exchanger E6A;
- for the cooler E3-A: owing to the fact that a portion of the heat of the effluent from the hydrotreating reactor R is recovered at the reboiling system of the separation column, it is necessary to cool this effluent less by means of the exchanger/cooler E3 before the knockout vessel 18.

The invention claimed is:

1. A process for the treatment of a pyrolysis gasoline C5+ containing mono-olefin, diolefin and sulfur-comprising hydrocarbons, comprising at least and in any order:
   a) a stage where the pyrolysis gasoline or a C6+ hydrocarbon cut resulting from the pyrolysis gasoline is hydrotreated in the presence of hydrogen and at least one hydrotreating catalyst at a temperature of between 220 and 380° C., so as to produce a hydrotreated effluent;

b) a stage where the pyrolysis gasoline or the hydrotreated effluent resulting from stage a), when the latter is carried out before stage b), is separated in a separation column into a top C5− hydrocarbon cut and a bottom C6+ hydrocarbon cut, said separation column comprising a reboiling section including two heat exchangers, at least one of the two exchangers being configured in order to carry out a heat exchange with a part of the bottom cut which is recycled in the column via the reboiling section, and in which one of the two heat exchangers of the reboiling section is fed with at least a part of the hydrotreated effluent, so to provide a part of the heat necessary for the operation of the reboiling section, and the other of the two heat exchangers is fed with a condensable fluid in the gas state that is pressurized steam.

2. The process as claimed in claim 1, in which the two heat exchangers are positioned in series so that the bottom cut, which is recycled in the column, successfully passes through the first heat exchanger and the second heat exchanger.

3. The process as claimed in claim 1, in which the two heat exchangers are positioned in parallel so that a part of the bottom cut recycled in the column passes through the first heat exchanger and the other part of the bottom cut recycled in the column passes through the second heat exchanger.

4. The process as claimed in claim 1, in which, when stage b) is carried out after stage a), said process comprises a stage c) in which a non recycled bottom cut resulting from stage b) is sent into a unit extracting aromatic hydrocarbons.

5. The process as claimed claim 1, in which, when stage b) is carried out before stage a), said process comprises a stage c') in which the hydrotreated effluent is sent into a unit extracting aromatic hydrocarbons.

6. The process as claimed in claim 1, in which stage a) employs a catalyst for the selective hydrogenation of mono-olefin and/or diolefin hydrocarbons.

7. The process as claimed claim 1, in which stage a) employs a hydrodesulfurization catalyst.

8. The process as claimed in claim 1, in which stage a) successively employs a bed of a catalyst for the selective hydrogenation of mono-olefins and a bed of a hydrodesulfurization catalyst.

9. The process as claimed in claim 8, in which stage a) is carried out in a single reactor successively comprising, in the direction of circulation of the feedstock, a bed of a catalyst for the selective hydrogenation of mono-olefins and a bed of a hydrodesulfurization catalyst.

10. The process as claimed in claim 1, in which, before stage a) or before stage b), when this is carried out before stage a), the diolefin hydrocarbons of the pyrolysis gasoline are selectively hydrogenated in the presence of hydrogen and of a hydrogenation catalyst, at a temperature of between 40 and 200° C., at a pressure of between 1 and 8 MPa and with an overall hourly space velocity (HSV), defined as the ratio of the flow rate by volume of the fresh feedstock of hydrocarbons at 15° C. to the total volume of catalyst, from 1 $h^{-1}$ to 100 $h^{-1}$, so as to produce an effluent having a reduced content of diolefin hydrocarbons.

11. The process as claimed claim 1, in which the pyrolysis gasoline results from a steam cracking unit.

12. The process as claimed in claim 1, in which the two heat exchangers are positioned in series and the bottom cut recycled in the column is sent through the heat exchanger fed with the condensable fluid in the gas state, a partially condensed condensable fluid is recovered from the first heat exchanger and the partially condensed condensable fluid is sent into the heat exchanger fed with the hydrotreated effluent, so as to at least partially vaporize said stream, and said partially vaporized stream being sent back into the heat exchanger fed with the condensable fluid in the gas state.

13. A process for the treatment of a pyrolysis gasoline C5+ containing mono-olefin, diolefin and sulfur-comprising hydrocarbons, comprising at least and in any order:

a) a stage where the pyrolysis gasoline or a C6+ hydrocarbon cut resulting from the pyrolysis gasoline is hydrotreated in the presence of hydrogen and at least one hydrotreating catalyst at a temperature of between 220 and 380° C., so as to produce a hydrotreated effluent;

b) a stage where the pyrolysis gasoline or the hydrotreated effluent resulting from stage a), when the latter is carried out before stage b), is separated in a separation column into a top C5− hydrocarbon cut and a bottom C6+ hydrocarbon cut, said separation column comprising a reboiling section including two heat exchangers, at least one of the two exchangers being configured in order to carry out a heat exchange with a part of the bottom cut which is recycled in the column via the reboiling section, and wherein one of the two heat exchangers of the reboiling section is fed with at least a part of the hydrotreated effluent, so to provide a part of the heat necessary for the operation of the reboiling section, and the other of the two heat exchangers is fed with a condensable fluid in the gas state, and The two heat exchangers are positioned in series and the bottom cut recycled in the column is sent through the heat exchanger with the condensable fluid in the gas state, a partially condensed condensable fluid is recovered from the first heat exchanger and the partially condensed condensable fluid is sent into the heat exchanger fed with the hydrotreated effluent, so as to at least partially vaporize said partially condensed condensable fluid, and resultant partially vaporized condensable fluid being sent back into the heat exchanger fed with the condensable fluid in the gas state.

14. The process as claimed in claim 13, in which, when stage b) is carried out after stage a), said process comprises a stage c) in which a nonrecycled bottom cut resulting from stage b) is sent into a unit extracting aromatic hydrocarbons.

15. The process as claimed claim 13, in which, when stage b) is carried out before stage a), said process comprises a stage c') in which the hydrotreated effluent is sent into a unit extracting aromatic hydrocarbons.

16. The process as claimed in claim 13, in which stage a) employs a catalyst for the selective hydrogenation of mono-olefin and/or diolefin hydrocarbons.

17. The process as claimed claim 13, in which stage a) employs a hydrodesulfurization catalyst.

18. The process as claimed in claim 13, in which stage a) is carried out in a single reactor successively comprising, in the direction of circulation of the feedstock, a bed of a catalyst for the selective hydrogenation of mono-olefins and a bed of a hydrodesulfurization catalyst.

* * * * *